(12) United States Patent
Ikavalko et al.

(10) Patent No.: US 10,508,924 B2
(45) Date of Patent: Dec. 17, 2019

(54) SYSTEMS AND METHODS FOR SHOPPING DETOUR DURING TRAFFIC CONGESTION

(71) Applicant: PAYPAL, INC., San Jose, CA (US)

(72) Inventors: Karin Andrea Ikavalko, San Jose, CA (US); Jeffrey Joseph Thomas, San Jose, CA (US); Michael Joseph Alves, San Jose, CA (US); Michelle Pujals, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 54 days.

(21) Appl. No.: 15/150,329

(22) Filed: May 9, 2016

(65) Prior Publication Data

US 2016/0252359 A1  Sep. 1, 2016

Related U.S. Application Data

(63) Continuation of application No. 14/481,119, filed on Sep. 9, 2014, now Pat. No. 9,354,065.

(51) Int. Cl.
*G01C 21/34* (2006.01)
*G01C 21/36* (2006.01)
*G01C 21/00* (2006.01)

(52) U.S. Cl.
CPC ......... *G01C 21/3415* (2013.01); *G01C 21/00* (2013.01); *G01C 21/3461* (2013.01); *G01C 21/3484* (2013.01); *G01C 21/3492* (2013.01); *G01C 21/3679* (2013.01); *G01C 21/3682* (2013.01)

(58) Field of Classification Search
CPC ............ G01C 21/3415; G01C 21/3461; G01C 21/3679; G01C 21/3484; G01C 21/3492; G01C 21/00; G01C 21/3682
See application file for complete search history.

(56) References Cited

U.S. PATENT DOCUMENTS

| | | | | |
|---|---|---|---|---|
| 5,802,492 A | * | 9/1998 | DeLorme | G01C 21/3476 340/990 |
| 5,931,888 A | * | 8/1999 | Hiyokawa | G01C 21/34 701/411 |
| 6,049,753 A | * | 4/2000 | Nimura | G01C 21/3484 701/428 |
| 7,792,703 B1 | | 9/2010 | Amidon et al. | |
| 8,612,312 B1 | | 12/2013 | Edwards et al. | |
| 8,793,066 B2 | | 7/2014 | Panabaker et al. | |
| 2003/0093217 A1 | | 5/2003 | Petzoid et al. | |
| 2003/0195694 A1 | | 10/2003 | Kozak et al. | |
| 2004/0215392 A1 | * | 10/2004 | Nam | G01C 21/3415 701/411 |
| 2005/0131836 A1 | * | 6/2005 | Armstrong | G06Q 20/06 705/64 |

(Continued)

*Primary Examiner* — Jelani A Smith
*Assistant Examiner* — Majdi Alsomiri
(74) *Attorney, Agent, or Firm* — Haynes and Boone, LLP

(57) ABSTRACT

A system or a method is provided to provide shopping detours to users during traffic congestions. In particular, the system may detect that a user is experiencing or is about to experience a traffic congestion. The system may then estimate the additional travel time needed to go through the traffic congestion. The system may also find shopping detours which allow the user to take the shopping detours to make purchases and still arrive at the final destination at about the same time as if the user stays in the original route with the traffic congestion.

20 Claims, 4 Drawing Sheets

(56) References Cited

U.S. PATENT DOCUMENTS

| | | |
|---|---|---|
| 2007/0150369 A1 | 6/2007 | Zivin |
| 2008/0033640 A1* | 2/2008 | Amano .............. G01C 21/3476 |
| | | 701/414 |
| 2008/0091341 A1 | 4/2008 | Panabaker et al. |
| 2009/0227280 A1* | 9/2009 | Raab ................. H04M 1/72536 |
| | | 455/550.1 |
| 2010/0114734 A1 | 5/2010 | Giuli et al. |
| 2010/0153008 A1 | 6/2010 | Schwartz et al. |
| 2011/0224893 A1* | 9/2011 | Scofield ............. G01C 21/3492 |
| | | 701/119 |
| 2012/0158299 A1* | 6/2012 | Cerecke ............. G01C 21/3446 |
| | | 701/533 |
| 2012/0173134 A1* | 7/2012 | Gutman ............. G01C 21/3469 |
| | | 701/400 |
| 2013/0226731 A1 | 8/2013 | MacNeille et al. |
| 2014/0129139 A1* | 5/2014 | Ellison ............... G01C 21/3469 |
| | | 701/533 |
| 2015/0168171 A1* | 6/2015 | Tanizaki ............ G01C 21/3461 |
| | | 701/426 |
| 2015/0178749 A1* | 6/2015 | Meng ................. G06Q 30/0203 |
| | | 705/7.31 |

* cited by examiner

SYSTEMS AND METHODS FOR SHOPPING DETOUR DURING TRAFFIC CONGESTION

CROSS REFERENCE TO RELATED APPLICATION

This application is a continuation of and claims priority to U.S. patent application Ser. No. 14/481,119, filed on Sep. 9, 2014, issued as U.S. Pat. No. 9,354,065, which is incorporated herein by reference in its entirety.

BACKGROUND

Field of the Invention

The present invention generally relates to systems and methods for shopping detours during traffic congestion.

Related Art

Consumers increasingly use electronic navigation devices to provide travel guidance and navigation. Although the electronic navigation devices may provide directions to various destinations, consumers often still experience traffic congestion that cause travel delays. For example, when a consumer is traveling home from work, the consumer may experience rush hour traffic that causes delay. Although there may be alternative routes for the consumer to take, these alternative routes may have the similar traffic delays due to the overall traffic congestion in the area. Therefore, there is a need for a system or method that provides meaningful detours for the consumer during traffic congestion.

Figure 1:
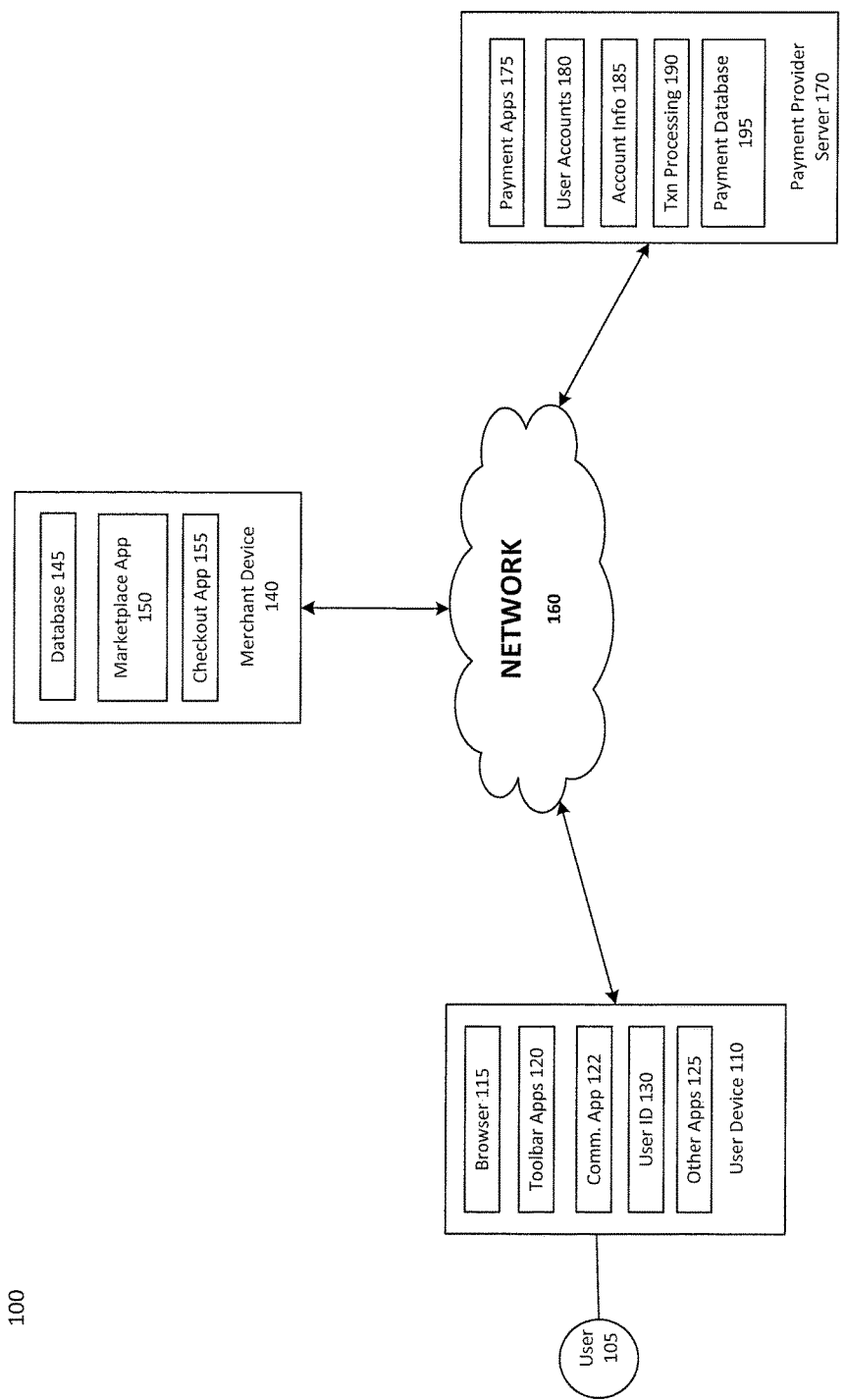
FIG. 1 is a block diagram of a networked system suitable for implementing shopping detours during traffic congestion.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or a method is provided to provide shopping detours to users during traffic congestion. In particular, the system may detect that a user is experiencing or is about to experience a traffic congestion or delay. The system may then estimate the additional travel time needed to get through the traffic congestion and arrive at the desired destination. The system may also find shopping detours which allow the user to take the shopping detours to make purchases and still arrive at the final destination at about the same time as if the user had stayed on the original route with the traffic congestion or which allow the user to take a shopping detour and spend less total time shopping and driving than if the user stayed on the original route and did the shopping on a separate trip.

In an embodiment, the system may analyze the user's purchase history, to-do-list, search history, watch list, wish list, calendar, or the like to determine items or services the user may desire to purchase. The system may find merchants that offer the desired items or services that are located near the traffic congestion or in-route to the final destination. The system may estimate the time required to take an alternate route to make purchases, including detour travel time, traffic conditions along the detour route, check-out line at the merchant, availability of items or services at the merchant, expected time to finish shopping and get back on a route to a desired destination, estimated traffic conditions along a route to the desired destination and drive time after the user has finished shopping, and the like. The system may compare the additional time caused by the traffic congestion with the time for taking the shopping detours and may present a list of possible shopping detours to the user. The possible shopping detours may allow the user to take one or more of the shopping detours and still save on total time, such as arriving at the final destination at about the same time as if the user had stayed on the original route or arriving after an estimated time with traffic, but spending less time driving to the destination with traffic and then later doing the shopping. The user may select and accept a shopping detour and the system may provide recommended directions to the user to take for the one or more shopping destinations. For example, even though a route to a desired shopping destination may be shorter if the user stayed on the current route, a longer route may be recommended to save time, such as by exiting the current route and proceeding along a longer, but faster route.

The system may also access the user's calendar to determine when the user may need to be at a certain location or destination. Based on that, the system may recommend staying on the current route with congestion, even though taking a shopping detour may save overall time, because the user would not be able to make it to the calendar appointment by taking the shopping detour.

Thus, a user may save time by taking a detour to make one or more purchases to allow traffic congestion or delays to reduce, even though the user may not need to make the purchase at that time.

In an embodiment, the system may provide incentives, such as coupons or discounts, along with shopping detour suggestions. These may allow merchants to advertise to consumers during traffic congestion. In an embodiment, the system may allow the user to browse and order the item or service while in route to the merchant. As such, the user may pick up the purchased item at the merchant quickly. In an embodiment, the system may estimate and compare not only the travel time, but also the travel cost, e.g., gasoline or electricity cost, of the shopping detour with those of the original route with traffic congestion. Thus, the user may compare the travel time along with other travel cost to decide whether to take a shopping detour and/or which shopping detour to take.

FIG. 1 is a block diagram of a networked system 100 suitable for implementing shopping detours during traffic congestions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, automobile console, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications. User device 110 also may include a positioning device, such as a Global Positioning System (GPS), a gyroscope, or other devices configured to detect a position and movement of the user device 110.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a saving account. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

In some embodiments, payment provider server 170 may store purchase history of various items purchased by user 105. Payment provider server 170 may analyze purchase history to determine user 105's purchase preferences, merchant preferences, and/or potential purchase targets. Payment provider server 170 also may have access to user 105's calendar, schedule, to-do list, emails, social network accounts, and the like. Payment provider server 170 may analyze these accounts to infer purchase preferences or purchase targets. In an embodiment, payment provider sever 170 may store travel history of the user 105 including routes taken by the user 105 or places or merchants visited by the user 105. The travel history may be used to infer user 105's travel preferences.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

Figure 2:
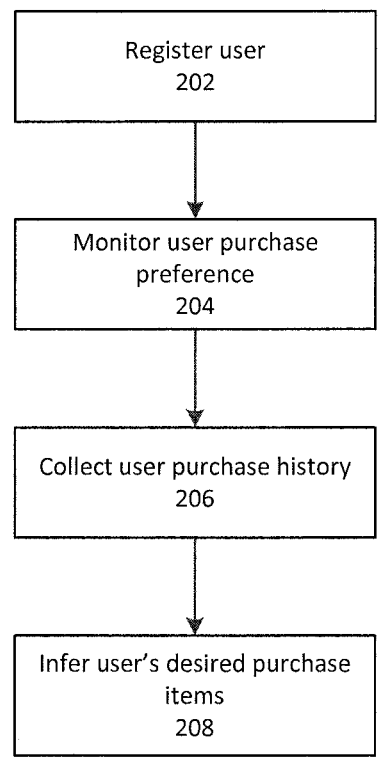
FIG. 2 is a flowchart showing a process of setting up a user account for shopping detours according to an embodiment.

FIG. 2 is a flowchart showing a process 200 for setting up a user account for shopping detours according to an embodiment. At step 202, a user may register at payment provider server 170. For example, a user may set up a payment account at payment provider server 170 using user device 140. The payment account may be used for making payments for purchases made by the user. The payment account may include user information, such as user identification, password, user preferences, funding accounts, and the like.

At step 204, payment provider server 170 may monitor user purchase preferences. For example, when user 105 uses user device 140 to search or browse various products or services, payment provider server 170 may determine a potential purchase target based on user 105's browsing or search history. For example, user 105 may have been searching or browsing various types of laptops using user device 140, the browsing and searching history related to the various types of laptops may be sent to payment provider server 170.

In one embodiment, user 105 may give permission to payment provider server 170 to access the browsing or search history at user device 140. Payment provider server 170 may analyze the browsing history and search history and determine that user 105 is looking to purchase a laptop. In particular, payment provider server 170 may determine the type of laptop user 105 is looking for. Thus, the type of the laptop may be designated as a purchase target. User 105's purchase history also may be used to determine the user's purchase preference. For example, the type of products or services that had been purchased by user 105, the merchants from which user 105 had made purchases, or the time and location where user 105 made purchases may be monitored and stored as a user purchase preference. In another example, payment provider server 170 may determine routine purchases, such as groceries, daily necessities, or the like, that are purchased by the user 105 routinely. Payment provider server 170 may determine the purchase routine frequency and may determine the user 105 likely is ready to make the routine purchase again soon. For example, the payment provider server 170 may determine that the user 105 typically purchases milk once a week on Friday. The payment provider server 170 may then infer that the user 105 may wish to purchase milk this Friday.

In an embodiment, user 105 may give permission to payment provider server 170 to access user 105's calendar, to-do list, schedule, wish list, social network accounts, contact lists, travel history, and the like. The payment provider server 170 may analyze this information and may determine purchase preference and/or purchase targets from this information. For example, based on the user 105's to-do list and social network, the payment provider server 170 may determine that a friend's birthday is coming up and the user 105 may wish to purchase a birthday gift for the friend. In another example, payment provider server 170 may analyze the user 105's travel history and may determine routine travel routes, such as commuting from home to work, taken by the user 105. Payment provider server 170 may identify merchants along user 105's routine travel routes and possible shopping detours or destinations.

At step 216, payment provider server 170 may collect user purchase history. For example, when user 105 uses user device 140 or an account with the payment provider to make a purchase, payment provider server 170 may collect information related to the purchase, including the identity and type of items purchased, price of the item purchased, location and time of purchase, merchant from whom the purchase was made, or other information related to the purchase. In an embodiment, payment provider server 170 may have access to user 105's account at various merchants and may determine user 105's purchase and/or browsing history at the merchants based on the user 105's account at these merchants. Payment provider server 170 also may access the user 105's electronic wallet and electronic coupons. For example, the user 105 may save or designate certain electronic coupons to be used later. Payment provider server 170 may determine purchase preference or purchase targets based on these saved electronic coupons.

At step 218, payment provider server 170 may infer the user 105's purchase targets or desired purchase items based on various information collected, as noted above. The purchase target may be inferred from routine purchases or from routine merchants whom the user 105 frequently visits. For example, the payment provider server 170 may determine that the user 105 typically visits an auto-mechanic shop to receive oil change service on the user 105's car once every three months. The payment provider server 170 may determine that an oil change service is a purchase target when the time for an oil change in the three month cycle is coming up soon.

The purchase target may be inferred from the user 105's wish list, to-do list, calendar, and/or social network. For example, the user 105 may have a task of purchasing a birthday card for the user's friend on the user 105's to-do list and the user 105's social network account indicates that the friend's birthday is coming up soon. The payment provider server 170 may determine that a birthday card or gift is a purchase target. In an embodiment, the purchase target may be inferred from environmental conditions detected by the user device 110. For example, the user device 110 may detect the time of the day, the season of the year, the weather condition and/or forecast, or the like. These environmental conditions may be used to infer a purchase target. If it's during meal time, purchase targets related to food products or services may be inferred. If the weather is too hot or too cold, services or products associated with outdoor activities may be avoided. If a car console detects that the user 105's car needs gas or certain maintenance, the purchase targets may include gas station or auto mechanics. Even if the car does not need gas right away, but may need gas the next day, a gas station may be a suggested purchase target if it enables traffic congestion to reduce during the time it takes the user to detour to a gas station, get gas, and get back on a route. If the car console or the user device 110 detects that the user 105 is falling asleep or has low energy, for example, by monitoring the user 105's heart beat or tracking the user 105's eye movement, purchase targets, such as coffee shops, rest areas, or rest stops, may be inferred.

In an embodiment, the payment service provider 170 may calculate a probability score for each target purchase item. The probability score may represent a likelihood that the user 105 intends to or desires to purchase the item. The probability score may be determined based on whether the item is a routine purchase. For example, if the item is consistently purchased many times as a regular routine, the probability score is higher. The probability score also may be determined based on the number sources the item is inferred from. For example, if the target purchase item is inferred from multiple sources, such as from the user 105's social network, the user's calendar, and the user's to-do list, the target purchase item may have a higher probability score.

The probability score also may be determined based on the type of sources the item is inferred from. For example, a target purchase item inferred from the user 105's to-do list may have a higher probability score than another target purchase item inferred from the user 105's watch list, because the user 105's to-do list indicates that the user 105 has decided to make the purchase while the user 105's watch list merely indicates that the user is interested in an item. The probability score may be used to determine whether the user 105 is about to or is intending to purchase an item. For example, when the probability score of an item is above a predetermined threshold, the item may be designated as a purchase target which the user 105 is intending to or desires to purchase. The predetermined threshold may be adjusted to increase or decrease the number of designated purchase targets.

By using the above process 200, various information may be collected to infer purchase targets that the user 105 may wish to purchase. In particular, information, such as purchase history, browsing history, to-do list, wish list, customer accounts, calendar, social network accounts, and the like, may be used to infer purchase targets that the user 105 may wish to purchase.

Figure 3:
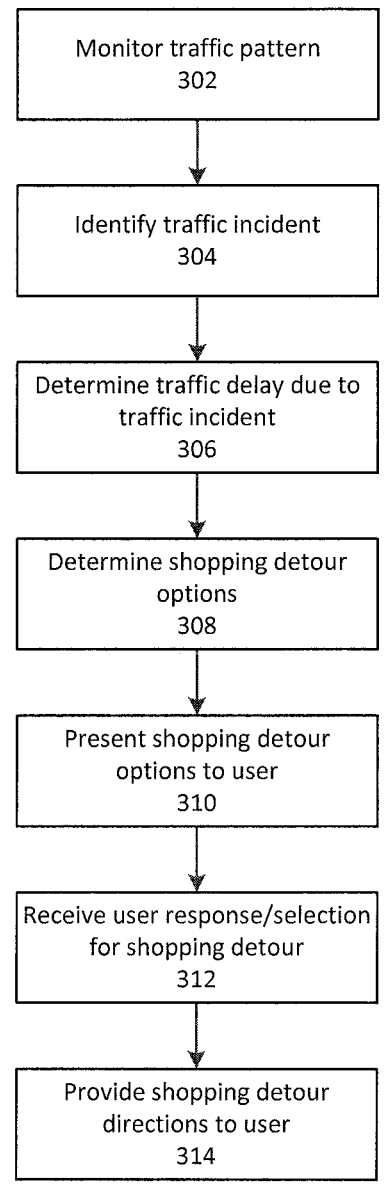
FIG. 3 is a flowchart showing a process for implementing shopping detours during traffic congestion according to one embodiment.

FIG. 3 is a flowchart showing a process 300 for implementing shopping detours during traffic congestion according to one embodiment. At step 302, user device 110 may monitor traffic patterns. In particular, user device 110 may include a Global Positioning System (GPS) device configured to detect the position and movement of user device 110. In particular, the user 105 may use the user device 110 to navigate or route the user 105 to a destination. The user device 110 may receive information regarding the traffic patterns near the user 105 and/or along the route to the destination. In an embodiment, user device 110 may send the location and route information to the payment provider server 170 and the payment provider server 170 may monitor the traffic patterns near user device 110 and/or along the route to the user 105's selected destination. Traffic information may be obtained from a third party that provides general traffic information to consumers or via crowd sourcing by receiving movement and/or location data from other users.

At step 304, the system may identify traffic incidents near the user 105 or along the user 105's route to the final destination. The traffic incidents may be general congestion due to overcrowding. The traffic incidents may be a car accident or road construction that causes traffic congestion. Information about the traffic incidents may be received from a third party service that provides traffic information to consumers. Information about traffic incidents also may be received from other users via crowd sourcing. In an embodiment, traffic incidents may be identified based on traffic history. For example, routine traffic congestion during certain rush hours may be identified at certain locations based on the traffic history. Information about the traffic incident may include type of incident, effect of the incident, such as traffic lane reduction, distance range of the traffic incident, stretch of traffic delay, speed of traffic through the incident, and other information about the traffic incident. In some embodiments, multiple traffic incidents near the user 105 or along the user 105's route may be identified.

At step 306, the system may determine traffic delay for the user 105 due to the traffic incident. In particular, the system may estimate the additional travel time that will be caused by the traffic incident. The traffic delay may be determined based on how far the user 105 currently is from the traffic congestion, the distance stretch of the traffic congestion, the speed of traffic in the traffic congestion, the speed of the traffic flow before and after the traffic congestion, speed limit, and the like. The traffic delay also may be determined based on how long the traffic congestion will last. For example, based on traffic history, time intervals of routine traffic congestion may be used to determine how long a typical traffic congestion will last. This information may be used to determine whether the traffic congestion will still be there when the user 105 reaches the location of the traffic congestion. In some embodiments, multiple traffic incidents may be identified and the traffic delays resulted from multiple traffic incidents may be estimated and aggregated.

At step 308, the system may determine shopping detour options in view of the identified traffic congestion. The system may determine the user 105's potential purchase targets as noted in step 208. For example, purchase targets may be inferred from information such as user's purchase history, browsing history, search history, to-do list, wish list, watch list, calendar, contact list, social network, and the like. The system then may select potential purchase targets that are most likely to be purchased and/or desired by the user 105 based on the probability scores of the items, as noted in step 208. The system may also determine whether the user 105 has coupons or discounts that are associated with these potential targets. The system then may determine whether there are merchants near the user 105, near or along the travel route, or along an alternative travel route to the user's desired final destination who offer the purchase targets for sale. The purchase targets may be products, services, or any items that may be purchased by the user.

After the merchants who offer the purchase targets for sale are identified, the system may determine the detour routes to the respective merchants. The detour routes may provide directions from the user 105's current location to the respective merchants, avoiding the traffic congestions, and then to the original final destination. In some embodiments, a detour route may include detours to multiple merchants. The system may estimate the time required to take the shopping detour. The time required for taking the shopping detour may include travel time to one or more merchants, shopping time at the merchant, and travel time from one or more merchants back to the original destination. To estimate travel time to the merchant, the system may consider traffic conditions near the merchant or along the route to the merchant, speed of traffic flow, number of traffic lights, traffic conditions along the route from the merchant back to the original destination, and the like. This traffic information may be obtained from a third party provider of traffic information or from other users by crowd sourcing.

To estimate shopping time at the merchant, the system may consider whether the store is crowded, condition of the check-out lines at the merchant, availability of the item desired by the user, wait time at the merchant (for service merchant), availability of parking spaces at the merchant, type of service desired, estimated service time, and the like. This information at the merchant's store may be provided by the merchant, a third party, or from other users by crowd sourcing. In some embodiments, shopping time at the merchant may be estimated based on the user 105's previous visits to the merchant. For example, if the user 105 has visited the merchant before, the system may estimate the user 105's shopping at the merchant based on an average shopping time of the previous visits to the merchant.

In another embodiment, the system may estimate the service time at the merchant based on the user 105's previous service time at the merchant. For example, based on previous visits to the same auto mechanic, the system may determine that a typical visit to the same auto mechanic is about 45 minutes for an oil change. The system may allow the merchants, such as service merchants, to post or input estimated service time for various types or services. In an embodiment, the system may receive business condition history from various merchants and may estimate a wait time or service time for respective merchants based on their business condition history. For example, the business condition history of a merchant may include routine patterns of business condition indicating how crowded the merchant store is during different times of the day, different days of the week, different months or seasons of the year. As such, the business condition history may be used to estimate how crowded the merchant store will be when the user visits the store.

The system may estimate the time for taking the shopping detours to respective merchants based on the respective detour travel time and shopping time. In some embodiments, the time for taking a shopping detour to multiple merchants also may be estimated. Based on the estimated additional travel time that would be caused by the traffic congestion, the system may identify various options for shopping detours. For example, if the traffic congestion is estimated to cause 45 minutes of additional travel time, the system may identify shopping detours that will take about 40 to 50 minutes, such that the user may take one of these shopping detours and still arrive at the destination at about the same time as if the user had stayed in the original route with the traffic congestion. In some embodiments, the system may determine the estimated arrival time to the final destination for both the original route and the detours. Thus, the user may compare these estimated arrival times for taking the original route and for taking different shopping detours.

In an embodiment, the system may select or suggest shopping detour routes that allow the user to visit and shop at one or more merchants and still arrive at the final destination at about the same time as if the user had stayed on the original route. In another embodiment, the system may select or suggest shopping detour routes that allow the user to visit and shop at one or more merchants and arrive at the final destination faster than if the user had stayed on the original route. For example, the system may check the user 105's calendar or schedule and may determine that the user 105 has an appointment at the final destination at a certain time. As such, it is important that the user 105 arrives at the final destination before the certain time. Thus, the system may select or suggest shopping detour routes that allow the user to arrive at the final destination with spare time to attend the appointment. In still another embodiment, the system may select or suggest shopping detour routes that allow the user to save on the total travel time. For example, the total time for taking the shopping detour routes may be less than the total time of staying on the original route and taking a separate trip to one or more merchants. Based on the user 105's preference, the system may suggest shopping detours accordingly.

In an embodiment, the system may estimate and compare the travel cost for staying in the original route with the traffic congestion and the travel cost for taking a shopping detour. In particular, the system may estimate the travel cost for staying in the original route with the traffic congestion. For example, the travel cost for staying in the traffic congestion may include gas expense, wear on the car, and the like. Depending on the type of vehicle, miles per gallon (MPG) of the vehicle, the driving style of the user, the delay time of the traffic congestion, the speed of the traffic flow through the traffic congestion, and the like, the additional gas used due to the traffic congestion may be estimated. Similarly, the travel cost for taking the shopping detour may be estimated based on the distance of detour, the speed of traffic flow for the detour route, the type of vehicle, MPG of the vehicle, driving style of the user, parking cost, and the like. The travel cost for staying in the original route with traffic congestion and the travel cost for taking a shopping detour may be estimated for the user 105's comparison. Thus, the user 105 may make decision on whether to take the shopping detour based on the travel cost comparison.

The traveling cost may be estimated for each shopping detour option. Thus, the user may compare the travel cost between different shopping detour options. In an embodiment, the system also may estimate the travel time and travel cost for taking a non-shopping detour, in which a detour is taken to avoid the traffic congestion without visiting any merchants. Thus, the user may compare the travel time and cost for taking a non-shopping detour with those of the original route and the different shopping detours.

At step 310, the system may present options for shopping detours to the user. In particular, information regarding the options for shopping detours may be displayed to the user 105 at user device 110. The options for shopping detours may be displayed as a list of detours to various merchants.

The information may include the name of the merchant, type of service or product offered at the merchant, the purchase target inferred, the price of the purchase target, wait time at the merchant, travel time for the detour to the merchant, travel cost for the detour, and the like. The estimated time for the shopping detour may be listed next to the estimated time delay due to the traffic congestion, such that the user may compare and decide whether to take the shopping detour. In an embodiment, the estimated travel cost for the shopping detour may be listed next to the estimated travel cost for staying in the original route with the traffic congestion.

In an embodiment, the list of options for shopping detours may be displayed to the user 105 in an order of inferred desirability of the purchase target. As noted above, a probability score may be calculated for each purchase target indicating how likely the purchase target is desired by the user 104 or how likely the user 105 intends to purchase the purchase target. The options for shopping detours may be displayed based on the probability score of the purchase target. In another embodiment, the list of options for shopping detours may be displayed based on how much the time for the shopping detour matches the delay time of the traffic congestion. For example, if the estimated traffic delay time is 30 minutes, the system may find shopping detours that take about the same amount of time of 30 minutes. The options of shopping detours that matches closely to 30 minutes may be displayed first on the list. In an embodiment, the list of option for shopping detours may be listed based on the travel costs for the different shopping detours. In still another embodiment, the user may be allowed to choose how the list of options for shopping detours is displayed. In an embodiment, the system may determine merchants that are located near each other and may determine a shopping detour for visiting multiple nearby merchants.

In an embodiment, the system may analyze the user 105's schedule or calendar and may determine that the user 105 needs to be at the final destination at a particular time. If no other detours are available that allow the user 105 to arrive at the final destination at or before the particular time, the system may suggest that the user 105 stay on the original route, without taking a shopping detour. In an embodiment, the system may suggest a longer route to the final destination, because the longer route may allow the user 105 to arrive at the final destination faster due to better traffic conditions, higher speed limits, or less traffic lights on the longer route.

At step 312, the system may receive user 105's response or selection of shopping detours from the list of options. The user 105 may decline all options of shopping detours and decide to stay on the original route with the traffic congestion. In this case, the system may continue to navigate the user 105 on the original route. In another scenario, the user 105 may review the list and may not see any desirable shopping detour options. In this case, the system may allow the user 105 to search for shopping detours to other merchants. For example, the user 105 may enter a product or service that the user 105 wishes to purchase. The system may search for merchants near the user 105 or near the original travel route that offer the product or service. The system may then determine shopping detours to these merchants and present them to the user 105 at step 314. In a scenario, the user 105 may select one shopping detour option. At step 314, the system may then present the directions for the selected shopping detour to the user 105 at user device 110.

In an embodiment, the system may allow the user 105 to select two or more shopping detour options to form a combined shopping detour. For example, from a list of shopping detours to different merchants, the user 105 may select a first merchant and a second merchant. In response to the multiple selections, the system may automatically determine a new shopping detour including these two selected merchants. The shopping detour may provide directions to these two selected merchants. Further, the system may calculate a new estimated shopping time for this new detour including the total shopping time for the user 105 to visit and purchase items from these two merchants. A new travel cost and/or a new arrival time to the final destination for the new shopping detour to multiple merchants also may be calculated and presented to the user 105.

In an embodiment, after the user 105 selects a shopping detour to one or more merchants, the system may allow the user 105 to pre-order products or make service appointment at the merchants, such that the user 105 may simply pick up the products or the merchants may be ready to render services to the user 105 when the user 105 arrives at the merchants. The shopping time may be reduced by pre-ordering products or services before the user 105 arrives at the merchants. In an embodiment, the system may automatically search and identify coupons or discounts related to the merchants or products selected by the user 105. The system may allow the user 105 to select and save the coupons to be used for the user's visit to the merchants.

By using the above processes 200 and 300, potential purchase targets that the user intends to purchase or desires to purchase may be identified via purchase history, browsing history, to-do list, wish list, calendar, social networks, and the like. When the user is experiencing or is about to experience traffic congestion along a travel route, the system may automatically determine and suggest shopping detours to the user, based on the estimated delay of the traffic congestion. The system may allow the user to select a preferred shopping detour and may provide directions to navigate the user to the merchant. Thus, the system allows the user to take a shopping detour to avoid traffic congestion and still arrive at the final destination at about the same time as though the user stays on the original route.

The above processes 200 and 300 may be implemented at the user device 110. In an embodiment, the above processes 200 and 300 may be implemented at the payment provider server 170 or the merchant device 140. In still another embodiment, the above processes 200 and 300 may be implemented by the user device 110, the payment provider server 170, and/or the merchant device 140 in coordination with each other. Note that the various steps described herein may be performed in a different order, combined, and/or omitted as desired.

The following are exemplary scenarios in which the above processes 200 and 300 may be implemented.

Example 1

A user uses a mobile device to provide travel navigation and direction. Based on the user's instructions, the mobile device maps a route from work to home for the user. However, based on information received from traffic information provider services, the mobile device determines that there is a traffic incident along the route that will cause delays in the drive time. As such, the mobile device may begin to determine different options of shopping detours for the user. Based on the user's to-do list, the user needs to purchase milk and eggs. Also, based on the user's social network and calendar, the user needs to purchase flowers for an anniversary. Further, based on the user's browsing history and wish list, the user wishes to purchase a hat. These potential purchase targets are inferred from various information about the user. The system may then search for merchants near the user, along an alternate route to the user's home, or near the route that offer the potential purchase target for sale.

A grocery store is found that offers milk and eggs for sale. A florist shop also is found that offers flowers for sale. A department store is found that offers various apparel and hats for sale. Further, based on the user's purchase history, the system also determines that the user's car is due for oil change. Thus, an auto-mechanic shop is found that offers oil change service. The system may determine detour routes to these respective merchants and travel time and cost and shopping or service time at these merchants. The travel time and travel cost for different detour options may be compared with the travel time and cost of the original route which includes the traffic congestion. For example, the travel delay for the original route is about 50 minutes. The shopping detour to the grocery store is 40 minutes, to the florist shop is 35 minutes, to the department store is an hour, and to the auto-mechanic shop is one hour and 10 minutes. The delays may be based on just a single stop to the specific merchant or be based on various combinations of the different merchants (such as grocery store and florist shop, grocery store, florist, and department store, etc.).

The information for different shopping detours may be presented to the user at the user's mobile device based on their shopping time. For example, shopping detours that have shopping times closest to the traffic time delay of the original route may be presented first (shopping detour to the grocery store and shopping detour to the florist shop). Detours provided first may also be ones that save the user the most overall time, factoring in the time the user would take to make a purchase if the user had to make a separate trip. The user may also be presented with the cost of gasoline for taking each shopping detour as compared with the cost of gasoline staying on the original route. Because the florist shop and the grocery store are located near each other, the user selects both the grocery store and the florist shop for shopping detour. The system automatically generates a new shopping detour for visiting both the grocery shop and the florist shop. The travel and shopping time of 50 minutes is estimated for the new shopping detour. The system also allows the user to browse and pre-order milk, eggs, and flowers from these merchants, which may be prepared and ready for the user's pick up. Thus, the user is presented with options for shopping detours to avoid the traffic congestion. The user is able to select shopping detours to pick up needed products and still arrives at home at about the same time as if the user stays on the original route with the traffic congestion.

Figure 4:
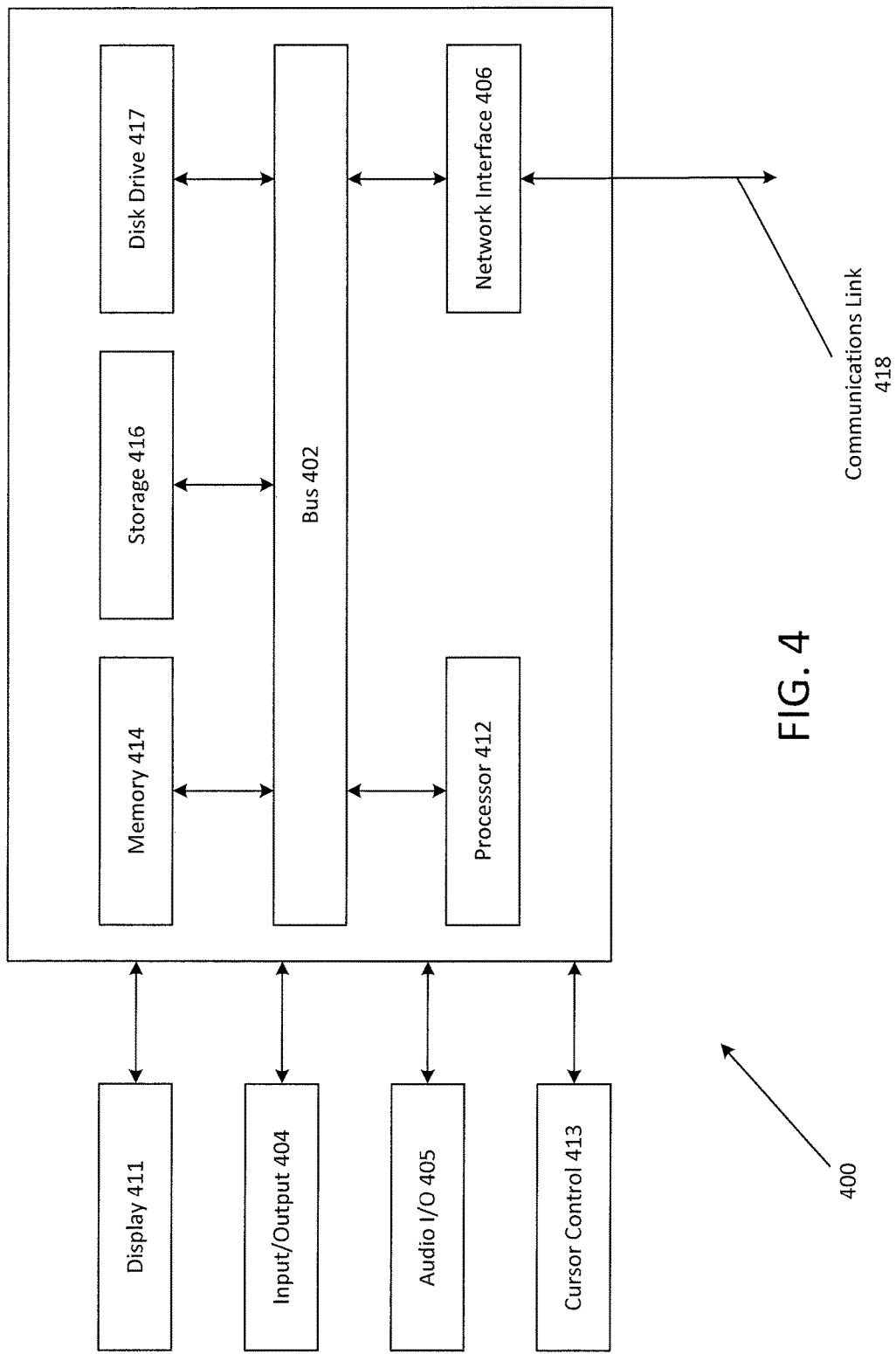
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information, data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
providing, via a user interface of a mobile electronic device to a user, navigation instructions for a first route of a first trip to reach a destination specified by the user;
detecting a traffic condition along the first route;
generating, in response to detecting the traffic condition, a second route to reach the destination, the second route being different from the first route, wherein the second route includes a visit to a first merchant that is selected based on a determined purchase target of the user;
calculating a first travel time associated with staying on the first route, a second travel time associated with taking the second route, and a third travel time associated with a second trip, separate from the first trip, to a second merchant to obtain the determined purchase target;
determining the second travel time is less than a total travel time that is a sum of the first travel time and the third travel time;
updating the user interface of the mobile electronic device such that the total travel time and the second travel time is presented to the user;
receiving, via the user interface of the mobile electronic device from the user, a selection of the second route subsequent to the presenting of the total travel time and the second travel time;
in response to the receiving, updating the user interface of the mobile electronic device such that navigation instructions for the second route of the first trip is presented to the user;
providing, via the user interface of the mobile electronic device, an input from the user of a purchase order corresponding to the determined purchase target; and
sending the purchase order to the first merchant.

2. The method of claim 1, further comprising calculating a first travel cost associated with staying on the first route and a second travel cost associated with taking the second route, wherein calculating the first travel cost and the second travel cost is performed using factors selected from the group consisting of: a remaining distance of the first route or the second route, a speed of traffic flow along the first route or the second route, a type of vehicle driven by the user, a miles-per-gallon of the vehicle, a driving style of the user, and a parking cost; and presenting the first travel cost and the second travel cost to the user via the user interface.

3. The method of claim 1, further comprising:
estimating a delay time caused by the traffic condition;
estimating a shopping detour time for traveling to and shopping at the first merchant; and
presenting, via the user interface of the mobile electronic device, the delay time and the shopping detour time to the user.

4. The method of claim 3, wherein the delay time caused by the traffic condition is estimated based on one or more of a speed of traffic flow through the traffic condition, a type of traffic condition, a duration of the traffic condition, a distance between the user and the traffic condition, or a distance stretch of the traffic condition.

5. The method of claim 3, wherein the shopping detour time is estimated based on one or more of a travel distance to the first merchant, a traffic flow speed along the second route to the first merchant, a wait time at the first merchant, or a parking availability at the first merchant.

6. The method of claim 1, wherein the determined purchase target is determined by:
inferring a purchase target from a wish list, a to-do list, a calendar, or a social network of the user;
determining a probability score that represents a likelihood that the user intends to purchase the purchase target; and
identifying that the probability score is above a predetermined threshold.

7. The method of claim 1, further comprising:
identifying discounts related to the first merchant or the determined purchase target.

8. The method of claim 1, wherein the second merchant is the first merchant.

9. A mobile electronic device, comprising:
a non-transitory memory; and
one or more hardware processors coupled to the non-transitory memory and configured to read instructions from the non-transitory memory to cause the mobile electronic device to perform operations comprising:
providing, via a user interface coupled to the one or more hardware processors to a user, navigation instructions for a first route of a first trip to reach a destination specified by the user;
detecting a traffic condition along the first route;
generating, in response to detecting the traffic condition, a second route to reach the destination, the second route being different from the first route, wherein the second route includes a visit to a first merchant that is selected based on a determined purchase target of the user;
calculating a first travel time associated with staying on the first route, a second travel time associated with taking the second route, and a third travel time associated with a second trip, separate from the first trip, to a second merchant offering the determined purchase target;

determining the second travel time is less than a total travel time that is a sum of the first travel time and the third travel time;

updating the user interface such that the total travel time and the second travel time is presented to the user;

receiving, via the user interface from the user, a selection of the second route subsequent to the presenting of the total travel time and the second travel time;

in response to the receiving, updating the user interface such that navigation instructions for the second route of the first trip is presented to the user;

providing, via the user interface, an input from the user of a purchase order corresponding to the determined purchase target; and sending the purchase order to the first merchant.

10. The mobile electronic device of claim 9, wherein the operations further comprise calculating a first travel cost associated with staying on the first route and a second travel cost associated with taking the second route, wherein calculating the first travel cost and the second travel cost is performed using factors selected from the group consisting of: a remaining distance of the first route or the second route, a speed of traffic flow along the first route or the second route, a type of vehicle driven by the user, a miles-per-gallon of the vehicle, a driving style of the user, and a parking cost; and presenting the first travel cost and the second travel cost to the user via the user interface.

11. The mobile electronic device of claim 9, wherein the operations further comprise:
estimating a first arrival time for taking the first route to a final destination;
estimating a second arrival time for taking the second route to the final destination; and
presenting, via the user interface, the first and the second arrival time to the user for comparison.

12. The mobile electronic device of claim 9, wherein the operations further comprise:
determining an arrival time at the destination based on a calendar of the user;
selecting, via the user interface by the user, the first travel route or the second travel route that allows the user to arrive at the destination on or before the arrival time; and
presenting, via the user interface, the selected first or second travel route to the user.

13. The mobile electronic device of claim 9, wherein the second route has a travel time less than that of the first route with the traffic condition.

14. The mobile electronic device of claim 9, wherein the determined purchase target is determined by:
inferring a purchase target from a wish list, a to-do list, a calendar, or a social network of the user;
determining a probability score that represents a likelihood that the user intends to purchase the purchase target; and
identifying that the probability score is above a predetermined threshold.

15. The mobile electronic device of claim 9, wherein the second merchant is the first merchant.

16. A non-transitory machine-readable medium having stored thereon machine-readable instructions executable to cause a machine to perform operations comprising:
providing, via a user interface of a mobile electronic device to a user, navigation instructions for a first route of a first trip to reach a destination specified by the user;
detecting a traffic condition along the first route;
generating, in response to detecting the traffic condition, a second route to reach the destination, the second route being different from the first route, wherein the second route includes a visit to a first merchant that is selected based on a determined purchase target of the user, wherein the determined purchase target is based at least on a wish list, a to-do list, a calendar, or a social network of the user, and wherein at least one of the wish list, the to-do list, the calendar, or the social network, each associated with a weighted;
determining a probability score that represents a likelihood that the user intends to purchase the determined purchase target based at least in part on the respective weight;
calculating a first travel time associated with staying on the first route and a second travel time associated with taking the second route and a third travel time associated with a second trip, separate from the first trip, to a second merchant to obtain the determined purchase target;
determining the second travel time is less than a total travel time that is a sum of the first travel time and the third travel time;
updating the user interface of the mobile electronic device such that the total travel time and the second travel time is presented to the user;
receiving, via the user interface of the mobile electronic device from the user, a selection of the second route subsequent to the presenting of the total travel time and the second travel time;
in response to the receiving, updating the user interface of the mobile electronic device such that navigation instructions for the second route of the first trip is presented to the user;
providing, via the user interface of the mobile electronic device, an input from the user of a purchase order corresponding to the determined purchase target; and
sending the purchase order.

17. The non-transitory machine-readable medium of claim 16, wherein the operations further comprise calculating a first travel cost associated with staying on the first route and a second travel cost associated with taking the second route, wherein calculating the first travel cost and the second travel cost is performed using factors selected from the group consisting of: a remaining distance of the first route or the second route, a speed of traffic flow along the first route or the second route, a type of vehicle driven by the user, a miles-per-gallon of the vehicle, a driving style of the user, and a parking cost; and presenting the first travel cost and the second travel cost to the user via the user interface.

18. The non-transitory machine-readable medium of claim 16, wherein the operations further comprise:
estimating a first arrival time for taking the first route to a final destination;
estimating a second arrival time for taking the second route to the final destination; and
presenting, via the user interface of the mobile electronic device, a delay time and a shopping detour time to the user for comparison.

19. The non-transitory machine-readable medium of claim 16, wherein the operations further comprise:
identifying that the probability score is above a predetermined threshold.

20. The non-transitory machine-readable medium of claim 16, wherein the second merchant is the first merchant.

* * * * *